(12) United States Patent
Korchev et al.

(10) Patent No.: US 7,297,486 B2
(45) Date of Patent: Nov. 20, 2007

(54) PRODUCTION OF MOLECULAR ARRAYS

(75) Inventors: Yuri Engenievich Korchev, London (GB); David Klenerman, Cambridge (GB); Christopher Abell, Cambridge (GB); Liming Ying, Cambridge (GB); Andreas Bruckbauer, Cambridge (GB)

(73) Assignee: Ionscope Ltd. (GB)

( * ) Notice: Subject to any disclaimer, the term of this patent is extended or adjusted under 35 U.S.C. 154(b) by 333 days.

(21) Appl. No.: 10/480,702

(22) PCT Filed: Jun. 13, 2002

(86) PCT No.: PCT/GB02/02727

§ 371 (c)(1),
(2), (4) Date: Jul. 9, 2004

(87) PCT Pub. No.: WO02/102504

PCT Pub. Date: Dec. 27, 2002

(65) Prior Publication Data

US 2004/0241681 A1    Dec. 2, 2004

(30) Foreign Application Priority Data

Jun. 14, 2001 (GB) ................... 0114522.6
Jan. 31, 2002 (GB) ................... 0202264.8

(51) Int. Cl.
*C12Q 1/68* (2006.01)
(52) U.S. Cl. .......................................................... 435/6
(58) Field of Classification Search ..................... None
See application file for complete search history.

(56) References Cited

U.S. PATENT DOCUMENTS 4,924,091 A    5/1990    Hansma et al.

5,730,940 A    3/1998    Nakagawa

FOREIGN PATENT DOCUMENTS

DE    195 42 620 A1    5/1997
WO    WO 00/63736      10/2000

OTHER PUBLICATIONS

MacBeath, G. and Schreiber, S.L. "Printing proteins as microarrays for high-throughput function determination" *Science*, 2000, pp. 1760-1763, vol. 289.
Müller, A.-D. et al. "Electrochemical pattern formation in a scanning near-field optical microscope" *Appl. Phys. A.*, 1998, pp. S453-S456, vol. 66.
Piner, R.D. et al. "'Dip-Pen' nanolithography" *Science*, 1999, pp. 661-663, vol. 283.
Zhang, H. et al. "Electrochemical microprocess by scanning ion-conductance microscopy" *J. Vac. Sci. Technol. B*, 1999, pp. 269-272, vol. 17, No. 2.

*Primary Examiner*—Young J. Kim
(74) *Attorney, Agent, or Firm*—Saliwanchik, Lloyd & Saliwanchik

(57) ABSTRACT

The subject invention pertains to a method for the production of an array of molecules immobilised on a substrate, comprising the deposition of the molecules from a micropipette containing them, onto the substrate, in a liquid environment, wherein the distance of the micropipette from the substrate is controlled in response to the ion current in the liquid. This method is particularly suitable for the deposition of biological molecules. The subject invention also pertains to an array of biological molecules deposited on a substrate.

12 Claims, 8 Drawing Sheets

PRODUCTION OF MOLECULAR ARRAYS

This application is the U.S. national stage application of International patent application No. PCT/GB02/02727, filed Jun. 13, 2002.

FIELD OF THE INVENTION

Their invention relates to nanotechnology, and more particularly to the production of molecular arrays.

BACKGROUND OF THE INVENTION

Currently there is a great interest in nanotechnology, the manipulation and study of matter at the nanometer scale (see a recent *Science* review, Nov. 24, 2000). There is a belief that, in the long term, nanotechnology will lead to useful devices or structures functioning on the nanometer scale. In recent years, the manipulation of small molecules and atoms has been demonstrated; for example the scanning tunnelling microscope tip has been used to write "IBM" with xenon atoms and also to perform local catalysis on a metal surface. The atomic force microscope (AFM) tip has also been used for so-called "dip-pen" nanolithography (Piner et al, *Science* 1999, 28, 3661), to write features by contact with gold surfaces using thiol chemistry, down to 10-20 nm feature size. However, these methods are not compatible with the use of biological molecules and not straightforward to implement. This is because they require very clean surfaces and careful control over the conditions of deposition.

To date, the only methods of note for manipulation of biological molecules are optical tweezers, the atomic force microscope (AFM) and microfluidics. Optical tweezers have been applied to biological molecules attached to micron-size beads. For example, tweezers have been used to stretch DNA molecules. The AFM has been used to bring one molecule on the tip into contact with a molecule on the surface. Both these methods are limited to manipulating single molecules one at a time (for a review, see *Nature Reviews* 2000, 1, 130).

Microfluidics, using patterned polymer films, has been used to flow biological molecules down channels for separation and analysis. It has been used on large single DNA molecules flowing along a channel, for molecule by molecule analysis (*Science* 2000, 294, 1536)). This method is limited in the range of possible applications and does not allow the opportunity to write in biological molecules.

Microcontact printing has also been used to create patterns of biological molecules on a surface by direct stamping. This is limited to one type of biological molecule and also has limitations in the feature size possible.

DNA and peptide arrays, provided on a single chip, are important tools in molecular biology. Their production, on a commercial scale, poses various problems.

The current methods for writing with biological molecules are based on spotting using a pipette or piezoelectric delivery in air. For example, in the manufacture of DNA arrays, the feature size is about 50-100 µm. The photolithographic method for DNA chip production developed by Affymetrix has a fundamental feature size limit, due to diffraction of about 250 nm. Moreover, this limit has not yet been realised due to inefficiencies in the chemistry.

Schreiber has recently described a simple protein array, obtained by spotting proteins onto aldehyde-functionalised glass slides (Science 2000, 289, 1760-1763). The spot resolution was 150 µm, and there were technical issues with keeping the protein solvated, and blocking off unreactive aldehydic sites. Thus, the manipulation and writing with biological materials lag well behind that of atoms and small molecules due to the lack of suitable methods.

Scanning ion conductance microscopy (SICM) is a form of scanning probe microscopy, to image the surface of living cells, e.g. at 50 nm resolution. The method is based on scanning a micropipette over the surface of a cell and using the ion current that flows to an electrode inside the pipette to maintain and regulate the distance from the surface.

As disclosed in WO-A-00/63736, when the sample-pipette distance is modulated, an additional modulated current is produced, which adds to the DC current. The modulated signal only becomes significant when the pipette is close to the sample. This provides a robust, reliable method of distance control and virtually eliminates problems in dc drift or changes in ionic strength.

Zhang et al, J Vac. Sci. Technology 1999, B17(2), 269-272, discloses that a micropipette can be used to process microcircuits and microstructures on a substrate, by SICM. It is limited to conducting surfaces and to electrochemical reactions. The micropipette tip-surface gap is controlled by the ion current, without distance modulation. If a smaller voltage is applied, then less deposition takes place, but this also affects the position of the pipette with respect to the surface; since the current would be smaller, the micropipette would move away from the surface to maintain constant current. Control is thus difficult if not impossible.

SUMMARY OF THE INVENTION

The present invention is based on the realisation that writing with biological molecules can be achieved, by reducing the size of the pipette used in SICM, to the nanometer scale. Thus, a micropipette of the type used in SICM can apply biological molecules to a surface. SICM is well suited for this task since it has been developed for imaging cells in physiological buffer and hence is perfectly compatible with biological materials. The pipette is a local and large reservoir of a high concentration of molecules allowing many applications. The micropipette diameter is typically 50-1000 nm and is easily altered by adjustment of the pulling parameters used. Since the micropipette-sample distance is controlled using the ion current, typically to the micropipette radius, this means that novel feature sizes of less than 1 µm, e.g. 10-100 nm, may be achieved. The application is performed entirely in solution so that the characteristics of the flow out of the pipette and diffusion are the only factors affecting feature size (any molecules not adsorbing locally onto the surface will get rapidly diluted by diffusion into the bath). Furthermore, the method can straightforwardly be extended to multiple applications by the use of multi-barrel micropipettes. Thus micropipette application of biological molecules appears to have many potential advantages over other methods.

The novel method can be used to deposit biological molecules at specific positions on a surface and also to control and monitor the deposition, down to the level of single molecules. The self-assembly and specific recognition possible with biological molecules offers intriguing possibilities for the production of novel nano structures and biosensors. Furthermore, it may be possible to exploit the specific recognition of biological molecules to directly print multiple copies of a single master structure once it has been created.

The pulsed delivery of single-stranded DNA molecules through a nanopipette has been demonstrated. The conical geometry of the pipette leads to a localized electric field since all the potential drop occurs in the tip region. Pulsatile delivery of DNA molecules can be achieved in an experimentally simple way with high precision by controlling the applied voltage. Single-molecule detection and fluorescence correlation spectroscopy in the nanopipette enabled determination of the number of molecules delivered. Anomalous slow diffusion of the DNA molecules in the pipette has also been observed. This nanopumping technique may have potential applications in local drug delivery, and nanofabrication of biomolecules on surfaces in aqueous environments.

DESCRIPTION OF PREFERRED EMBODIMENTS

The present invention can be used to deposit any desired molecule onto a wide variety of substrates. Examples of molecules that can be deposited include biological molecules such as polynucleotides and polypeptides (which terms are used to include oligonucleotides, oligopeptides and proteins). More particularly, the invention can be used to deposit long and short DNA, small molecules such as biotin, proteins such as streptavidin and antibodies, preferably proteins such as enzymes and antibodies, DNA and other small molecules. Size is not critical; most biological molecules are 5-10 nm, while long DNA is a long thin cylinder. In certain cases, it may be desirable to coat the wall of the pipette at its tip, so that the molecules do not stick to the glass.

Figure 1A:
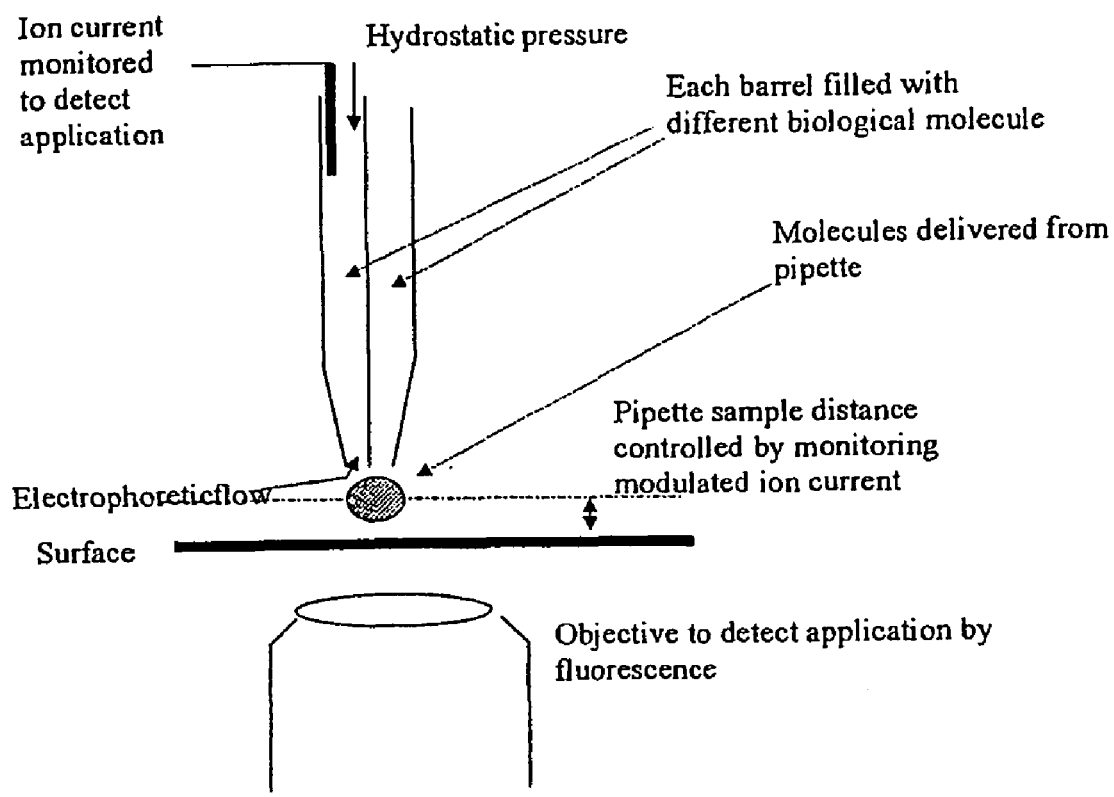
FIG. 1A is a schematic view of a device that can be used in the invention.

The principle underlying the invention is illustrated in FIG. 1A of the accompanying drawings. The pipette is immersed in solution above the surface onto which application will take place. Local application can be controlled by the hydrostatic pressure applied and the size and direction of the electrophoretic flow as well as the pipette-sample distance. The molecules can be applied by deposition at a controlled distance from the surface, or in a "tapping mode" where the pipette amplitude of oscillation is increased so that the pipette comes very close or touches the surface for application. The surface is scanned under the pipette for writing. The surface-pipette distance may be controlled with nanometer precision using the modulated ion current.

The ionic strength in the micropipette may be different from the bath. Thus, there may be a clear change in conductance at the tip of the pipette on application, since the conductance will change from that of the bath solution to that of the micropipette solution. This allows monitoring of the application in situ. The applied voltage may be altered to control application as well as the pipette-sample distance. The amount of molecules applied to the surface may be monitored by sensitive fluorescence spectroscopy, e.g. using an inverted microscope. Partial blocking of the ion current may be used to monitor delivery of large molecules.

The size of the features formed on the surface will depend, inter alia, on the following parameters:
1. The pipette diameter; this can be, for example, 10-100 nm.
2. The pipette-sample distance; this may be controlled using the modulated ion current.
3. The applied voltage; this controls the size and direction of the electrophoretic flow.
4. The applied pressure (which leads to hydrostatic flow).
5. The concentration of biomolecules in the pipette.

6. The ionic strength; this can reduce the effective diameter of the pipette due to electrostatic interactions between charged molecules and the surface.
7. The duration and mode of the application, i.e. at fixed distance or in tapping mode. In the tapping mode, it is possible that the number of applications can control the number of applied molecules without increasing the feature size.

The molecules to be delivered are typically oligonucleotides (DNA) or oligopeptides. These molecules may be labelled. For example, the use of fluorescently labelled molecules allows direct visualisation of the features on the surface, e.g. using laser confocal microscopy during or directly after application. A suitable microscope has two channels for FRET or dual colour experiments. Gold-coated mica may allow higher resolution AFM imaging.

Immobilisation of the delivered molecules on the surface to be coated can be achieved by a variety of means, physical and chemical. Examples are by biotin-(strept)avidin binding, or by charge.

FIG. 1A shows a two-barrel pipette, although one or more than 2 barrels may also be used, depending on the molecule or molecules to be delivered. For example, water-soluble molecules such as DNA or peptides can be delivered from one barrel, and another molecule from the other, simultaneously or sequentially. Structures can be built up, by returning to the same point on the substrate surface and depositing different molecules, at the same position, and repeating this until the desired structure or molecule is provided at the appropriate location.

Controller software may be used to make lines or patterns of molecules on the surface of the substrate, so that work can be done on the same surface but at different points. For instance, a series of parallel lines of different DNA molecules can be written on the surface for cleavage. Both the control and experiment can then be performed, by applying the appropriate enzyme from the pipette to a DNA line.

In order to load the solution or solutions for deposition into the micropipette, a variety of methods may be used. In particular application of negative pressure or voltage of the appropriate polarity can be used. In this fashion, with appropriate washing steps, the solution in the pipette or one of the pipette barrels can be readily interchanged.

For the purpose of pipette delivery characterisation, the flow of a fluorescently labelled DNA and protein such as streptavidin from the pipette can be determined as a function of pressure, applied voltage and pipette size. This is important for all subsequent experiments and also useful for functional mapping experiments on living cells. This will be done into bulk solution using single molecule fluorescence, to directly follow the trajectories of fluorophor labelled molecules at the tip of the pipette. This has been done previously for 500 nm pipettes by Zander et al, *Chem. Phys. Lett.* 1998, 286, 457. Surface modifications of the pipette to reduce non-specific adsorption can be adopted, e.g. using silane chemistry, if necessary.

A preferred embodiment of the invention is the production of arrays. Whereas DNA arrays prepared by either spotting or delivery with piezoelectric-driven micropipettes have a feature size that is typically 200 µm in diameter or larger, the micropipette allows this size to be reduced to less than 100 nm. The arrays can be quickly built up by delivering the DNA in a spotting action as the pipette is rapidly tapped over the glass surface. This may be performed under solution. The DNA is typically coupled to the surface using streptavidin-biotin interaction. Different combinations of DNA molecules may be delivered at one site or separate sites using a double barrel pipette. This may be assayed using two fluorescently labelled DNA molecules labelled with two different fluorophors and imaged with a two colour confocal microscope.

The micropipette may also be used to set up protein arrays. For example, the surface may be coated with carboxy-terminated dextran (which has the advantage that it provides a softer landing for the pipette, thereby avoiding damage). The carboxyl groups can be locally activated by delivering the requisite coupling agents down another barrel of the pipette. For example, in this way, NHS esters can be made at a site immediately before the protein is delivered, or $Ni^{2+}$ can be delivered locally to facilitate NTA/$His_6$ interaction.

By means of the present invention, the feature size can be 1 µm or less. Further, protein delivery in solution and local application of coupling agent can bypass the problems described by Schreiber, supra. It is worth noting that the smaller feature size requires smaller amounts of protein, which can be produced for example by in vitro translation systems.

Having set up a protein array, a range of protein-protein, and protein-small molecule, interactions can be explored. Generic (commercially available) systems to demonstrate the utility of the arrays are described by Schreiber, supra. For example, protein G (fluorescently labelled) and immunoglobin G are useful as a model for protein-protein interactions, and fluorescently labelled biotin and immobilised streptavidin as a model for protein-small molecule interactions.

It has previously been shown that DNA coated with silver can act as a relatively short nanowire (Braun et al, *Nature* 1998, 391, 775). An extended strand of dsDNA may be delivered to a surface by pushing it out of the pipette (like making a line of toothpaste on a surface). It has been shown that the attachment of DNA to a negatively charged surface, such as glass, can be modulated by the presence or absence of divalent cations such as $Zn^{2+}$. The DNA may be continuously or intermittently pinned to the surface by delivering $Zn^{2+}$ locally from another barrel of the pipette. If lengths of sticky-ended DNA are delivered sequentially in this way, extended strands of DNA may be assembled on a surface, which may initially be characterised by tapping mode AFM. These fragmented wires may subsequently be manipulated by ligases to stick them together or endonucleases to create local breaks. The DNA may lie flat against a surface, but it is preferred that the DNA should act as an enzyme substrate which is able to locally dissociate between two pinned sites. Long lengths of fluorophor-labelled phage DNA may be used for these experiments, and the DNA may be visualised using intercalator dyes such as YOYO. The method of Braun et al, supra, may then be used to form silver wires by depositing silver on the surface-attached DNA.

Multi-component 3-dimensional structures made from proteins or/and DNA can be assembled. The easiest way to exemplify this is using the biotin/strepatvidin system. For example, alternate layers of streptavidin and a biotinylated protein may be delivered onto a spot by alternately delivering them from different barrels of the pipette. In this way, a tower can be grown up from the surface. The streptavidin and protein may be labelled with different fluorophors for visualisation. Likewise, it may be possible to graft together lengths of sticky-ended DNA orientated orthogonal to the surface, or alternate terminally biotinylated DNA with streptavidin spacers.

International Patent Application No. PCT/GB02/01382 discloses that it is possible to deposit a single alpha toxin channel into a cardiac myocyte and detect this using a patch clamp. The patch clamp recording is characteristic of a single alpha toxin channel. The present invention allows the development of a more general and flexible method for controlled delivery based on monitoring fluorescence or partial blocking of the current in the micropipette.

The following Examples illustrate the invention.

EXAMPLE 1

As suggested above, the invention makes it possible to deliver therapeutic DNA or proteins to a specific position on a living cell by manipulating the pipette with precise distance control. Both shear force and ion conductance are potential distance regulation methods. As a first step to use the pipette for controlled delivery, it is essential to characterize the flux of biomolecules in the nanopipette as the applied voltage is altered. This Example reports the programmable delivery of dye-labelled DNA molecules through a nanopipette by electrical control. Quantitative measurements using single-molecule spectroscopy and fluorescence correlation spectroscopy (FCS) enable the determination of the number of molecules delivered.

Instrumentation

A home-made single-molecule confocal fluorescence microscope was used; see Ying et al., J. Phys. Chem. B, 2000, 104, 5171-8; and Wallace et al, PNAS USA 2001, 98, 5584-9. This microscope, equipped with a piezo-electric nanomanipulator, was used to view and position the pipette in the laser focus and also detect the fluorescence signal from dye-labelled DNA. An argon ion laser (Ion Laser Technology 5490AWC-00) at 488 nm was used as the excitation source. The collimated linear-polarized laser beam was directed through a dichroic mirror to the inverted microscope (Nikon Diaphot 200) and focused by an oil immersion objective (Nikon Fluor 100×, NA 1.30). Fluorescence was collected by the same objective and imaged onto a 100 mm pinhole to reject out of focus fluorescence and other background. The fluorescence was then filtered by a bandpass and a longpass filter (Omega Optical 535AF45 and OG515) before being focused onto an avalanche photodiode, APD (EG&G SPCM AQR-141). Output from the APD was coupled to a PC implemented multichannel scalar card (EG&G MCS-Plus). A bent nanopipette was mounted to a home-made nanomanipulation system consisting of a modular focusing unit (Nikon 883320), a mechanical translation stage and a three-axis piezoelectric translation stage (Piezosystem Jena Tritor38). The modular focusing unit and the mechanical translation stage were used for coarse positioning of the nanopipette. The piezoelectric stage was used for fine adjustment.

Glass pipettes with inner radii around 50 nm were routinely fabricated using a laser-based pipette puller (Sutter Instrument P-2000). A voltage was applied to the nanopipette through two Ag/AgCl electrodes, one in the bath and the other inside the pipette, serving as the working and reference electrodes respectively. The ion current flow through the pipette was amplified by a high impedance amplifier and monitored by an oscilloscope.

Materials and Experimental Procedure

A DNA oligonucleotide (SEQ ID NO. 1) was synthesized by Cruachem (Glasgow, UK) and was purified twice by HPLC. The 3' end was modified by Rhodamine Green (Molecular Probes). The concentration of the dye-labelled DNA was determined by UV-Vis absorption at 260 nm, and the absorbance at 504 nm was used as an internal reference. The purity of the sample is better than 95% based on this internal check.

100 nM DNA solution was back-filled to the bent nanopipette by a microfiller (World Precision Instruments Microfil 34). Blockage of the nanopipette was avoided by filtering the solutions through a 20 nm filter. A coverglass bottomed dish (Willco Wells GWST-1000) containing 2-3 ml solution was used as the bath. The pipette tip was placed 5 to 10 µm above the dish surface. Identical buffers (10 mM Tris-HCl, 100 mM NaCl) were used both in the pipette and in the bath. For single-molecule detection in the nanopipette, 5 nM DNA solution was used and the laser power was 0.25 mW. Fluorescence correlation measurements were performed by correlating the MCS signal in real-time using our own software developed in Labview environment (National Instruments Evaluation Version 5.0).

Figure 1B:
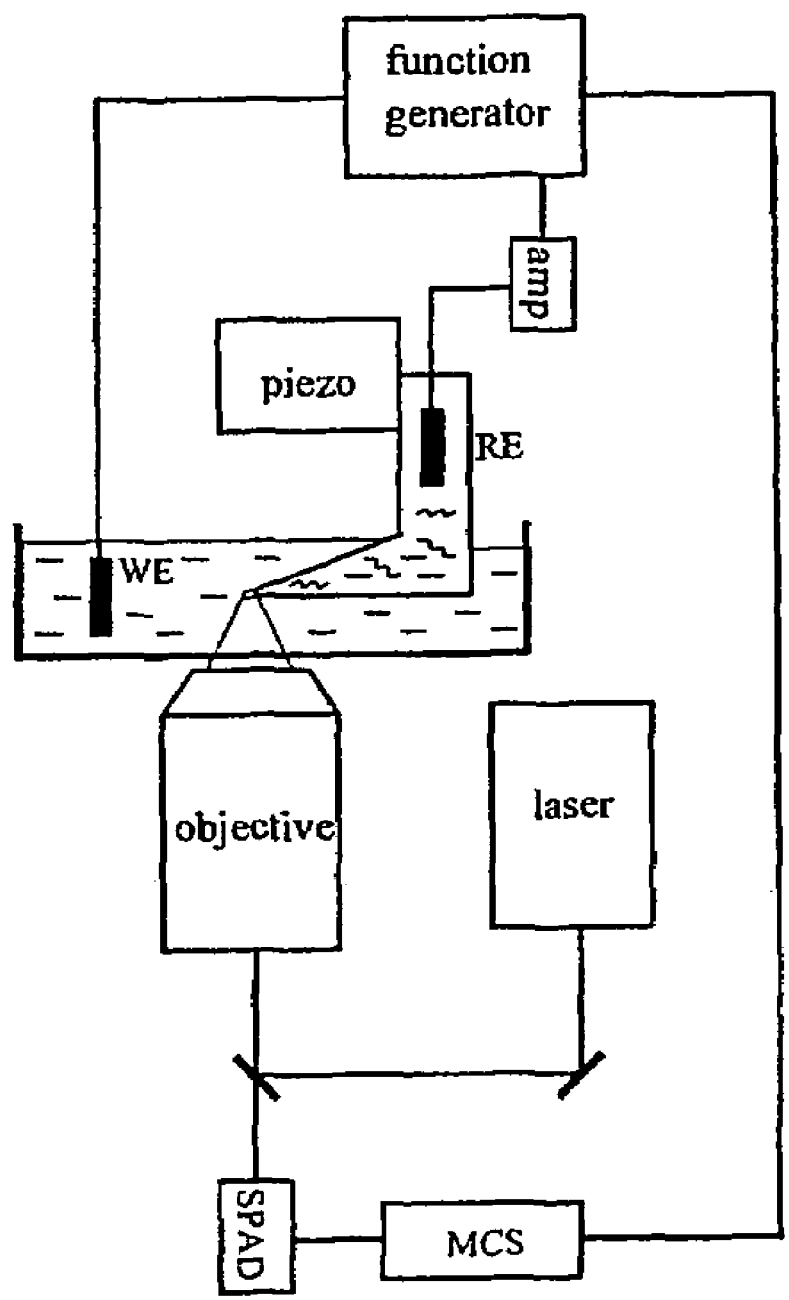
FIG. 1B is schematic of an experimental setup. SPAD: single photon counting avalanche photodiode, MCS: multi-channel scalar.

FIG. 1B is a schematic view of the experimental setup. A video image of the nanopipette and fluorescence spot near the tip, excited by a focused 488 nm laser beam, showed a spot size of around 500 nm, bigger than the inner diameter of the pipette due to the limitation of far-field optical resolution, which is consistent with the probe volume measurement using FCS. When the laser focus was moved into the pipette, an elliptical fluorescence spot with length around 1.5 mm was observed.

When a voltage was applied across the two electrodes, the potential drop occurred almost entirely in the tip region, due to the conical geometry of the pipette. The applied electric field was highly non-uniform and was located very close to the tip (the field strength drops to less than 1% of the maximum at 10 µm distance away from the tip). High field strength (several kV/cm) was easily achieved near the tip with very low applied potential (hundreds of mV), in contrast with the standard capillary electrophoresis method which requires a high voltage source.

Figure 2:
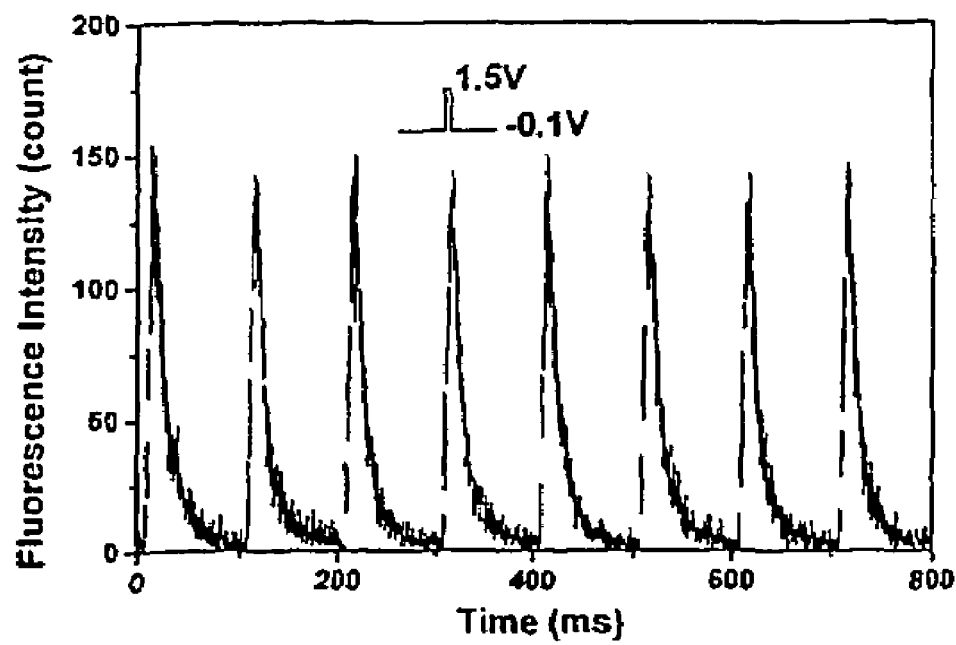
FIG. 2 shows the results of pulsatile delivery of DNA molecules by voltage modulation at 10 Hz. Highly repetitive pulses have been observed. Optimal pulse can be obtained by manipulating the modulation amplitude and duty cycle. The laser was focused about 0.5 mm in front of the tip opening. The MCS integration time bin width is 0.2 ms. (A) Modulating from −0.1V to 0.6V with positive voltage duration of 30 ms, about 150±20 molecules were detected per pulse; (B) Modulating from −0.1V to 1.5V with positive voltage duration 5 ms, about 460±50 molecules were detected per pulse.
Figure 2:
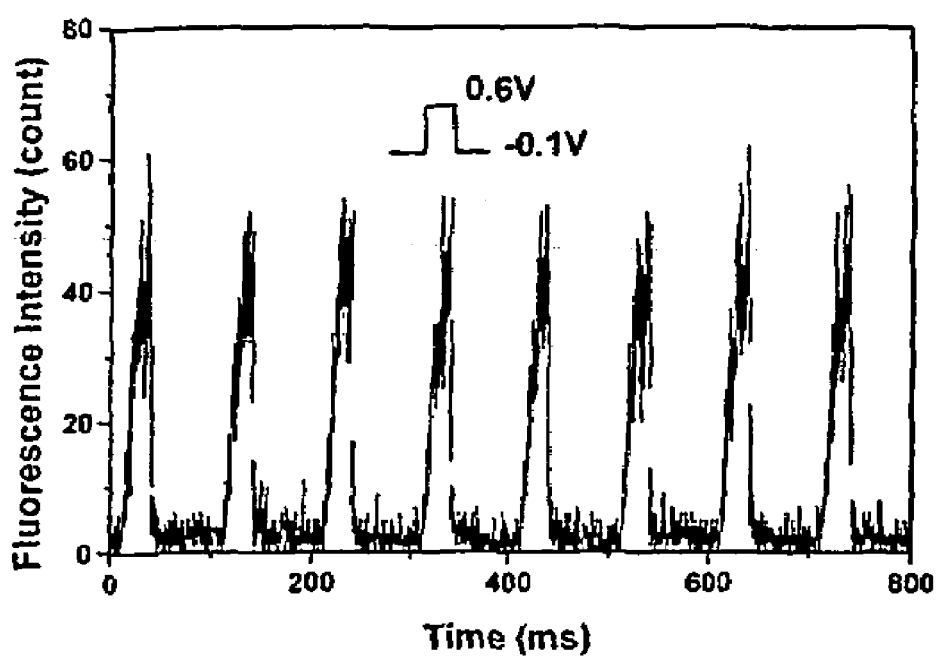

When the applied voltage was modulated with a square wave at a controlled frequency using a function generator, highly repetitive pulsed delivery of DNA was achieved, as shown in FIG. 2. Optimal pulses with high on/off ratio could be obtained by manipulating the modulation amplitude and the duty cycle.

The number of molecules delivered was estimated based on single-molecule photon burst size and characteristic diffusion time measurements and will be discussed below. In FIG. 2A, about 150±20 molecules were detected per pulse when modulating at 10 Hz from −0.1V to 0.6V with positive voltage duration of 30 ms; while in FIG. 2B, about 460±50 molecules were detected per pulse when modulating from −0.1V to 1.5V with positive voltage duration of only 5 ms. In the latter case, the result suggests non-linear focusing of the DNA molecules towards the nanopipette tip because the temporally averaged mean field is negative, which would drive the macroions deep into the pipette if the system response were linear, instead of exiting the pipette as was observed. The mechanism may be similar to non-linear electrophoresis.

Figure 3:
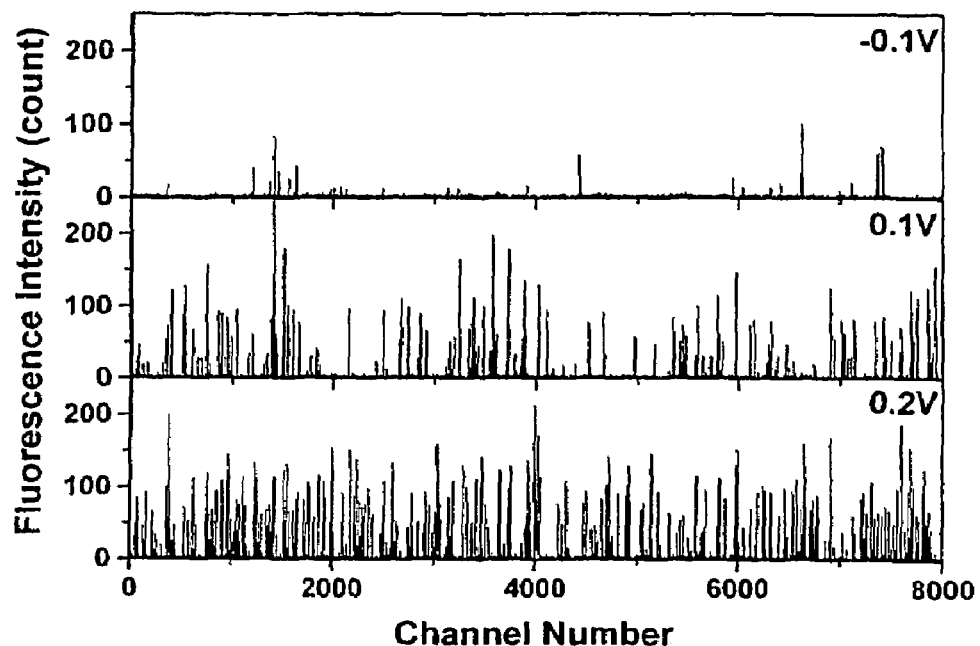
FIG. 3 shows single-molecule detection of a rhodamine green-labelled 20-mer ss-DNA exiting from a nanopipette. The laser focus was centered at the opening of the pipette tip. The MCS bin width is 1 ms. (A) At different applied voltages; (B) Voltage modulation from −0.1V to 1.0V.
Figure 3:
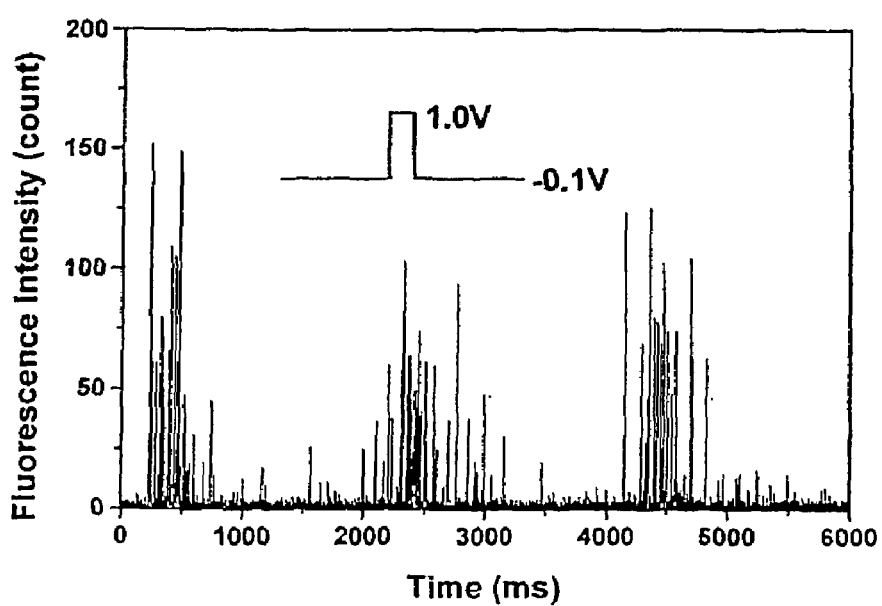

To estimate the number of molecules delivered per pulse, single molecule measurements were carried out near the nanopipette tip. In these experiments, the laser focus was centered at the opening of the nanopipette. As the diffraction-limited spot size was much bigger than the pipette radius, most of the molecules coming out of the pipette tip could be detected. Single-molecule burst size analysis gave the mean number of photons detected from each molecule as 35 per millisecond at the excitation laser power of 250 µW. Single-molecule measurements at different applied voltage provided a clear view of how the burst frequency changes with voltages; see FIG. 3A. Pulsed delivery of DNA molecules with single-molecule detection was demonstrated in FIG. 3B. About 20 individual molecules were detected per cycle.

The S/N ratio was high (background 0.7 counts/ms, maximum single-molecule burst 150 counts/ms). There was no serious back-scattering of the tightly focused laser beam on the glass wall even though there is significant difference in the index between water and glass media.

Fluorescence correlation measurements were carried out inside the tip of the pipette and in the open volume, to determine the diffusion constant of DNA and to address how the glass surface impedes the diffusion of ss-DNA molecules. The diffusion coefficient of the dye-labelled ss-DNA in free solution is $1.7 \times 10^{-6}$ cm$^2$sec$^{-1}$, compared to that of $8.1 \times 10^{-8}$ cm$^2$sec$^{-1}$ with a temporal exponent of 0.81 in the nanopipette. The anomalous diffusion of DNA is thought to be a result of the confinement of the glass wall. A factor of about 20 longer diffusion time was observed, for confined short ss-DNA molecules. When a potential of several hundred millivolts was applied, there was no significant difference in the autocorrelation curve, indicating that the flow rate is quite slow compared with the diffusion. However, a large decrease (~ a factor of 20) in the correlation amplitude was observed when the voltage changed from 50 mV to 300 mV. This suggests a substantial concentration enhancement in the tip region because the correlation amplitude is inversely proportional to the number of molecules in the confocal volume. Given the mean diffusion time through the laser focus and the mean count rate of single-molecule fluorescence, it is estimated that on average 28 counts can be detected with laser excitation power 100 μW for an individual rhodamine green-labelled DNA molecule passing through the laser focus, when the beam is centered on the opening of the pipette. In this calculation, the possible fluorescence lifetime has been neglected, as has the spectrum change due to the effect of confining microcavity formed in the nanopipette tip.

Figure 4:
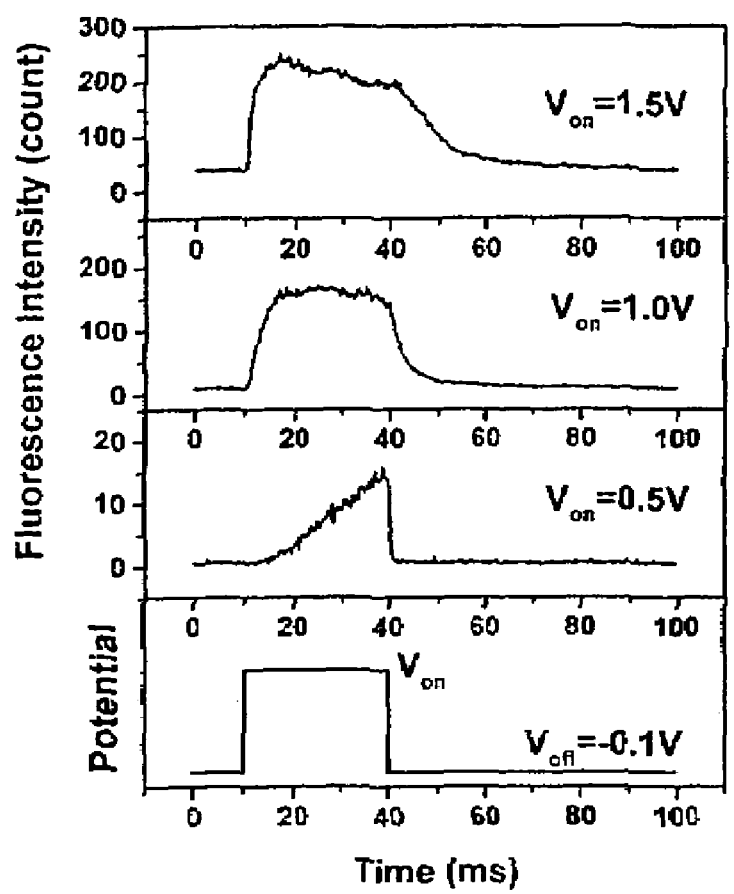
FIG. 4: A) Pulse patterns of fluorescence at different modulation amplitude. The modulation frequency is 10 Hz and the duty cycle is 0.3. The MCS bin width is 0.2 ms. Ten cycles were averaged to reduce the shot noise. B) The number of DNA molecules detected per pulse as a function of applied voltage $V_{on}$. A linear relationship was observed.
Figure 4:
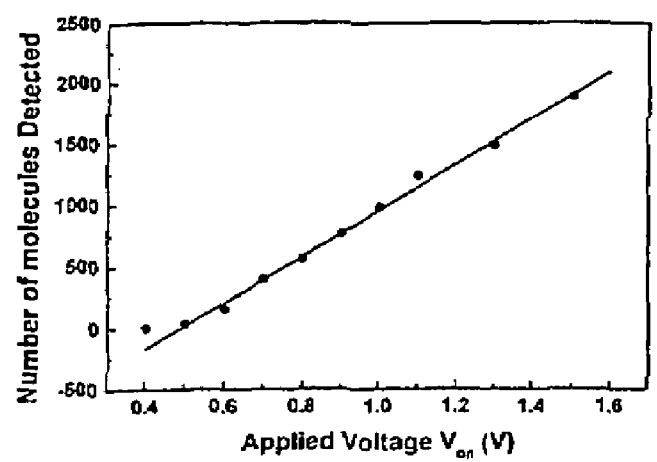

FIG. 4A shows the pulsatile delivery patterns generated at different modulation voltages. A small negative potential is required to achieve high modulation depth in the fluorescence signal. At low voltages, a slow rise and a fast decay of the fluorescence are observed. At high voltages, the decay becomes much slower when the voltage is reversed, indicating that DNA molecules continue to exit the pipette driven by the local concentration gradient. The concentration of DNA in the tip region could be increased by two orders of magnitude by applying a suitable sign voltage pulse. The duration of the pulse could be used for controlled delivery of DNA through the nanopipette. As a result, it was possible to observe highly controlled delivery of DNA through the nanopipette. For example, a peak fluorescence intensity of 200 counts per 0.2 ms corresponds to 72 molecules in the detection volume. Assuming the effective confocal volume on the order of 0.01 fL for a 50 nm pipette, then in the focused region, the concentration would be around 12 μM. However, the concentration distribution in narrow conical structure was expected to be heterogeneous when the effect of surface charge is considered. The delivery efficiency per modulation cycle as a function of voltage is shown in FIG. 4B. A linear relationship was found when the voltage is larger than 0.5V. The linear dynamic range for the number of molecules detected is between 100 and 2000 in pulsed delivery using 100 nM sample. Delivery from a few molecules to a few thousand molecules per pulse can be easily controlled by changing the modulation amplitude and sample concentration. In continuous delivery mode, a linear relationship was also observed at applied potential between 0.2V and 1.0V. Even higher potential induces a significant trapping effect, and the system response is non-linear.

The frequency response of the nanopipette system for pulsatile delivery was also examined. At frequencies higher than 200 Hz, it was difficult to observe the change in count rate as the number of counts becomes very small in a short collection time. As such, the fluorescence autocorrelation function was used to reveal the fluctuation in time domain. At 1000 Hz, deep modulation can still be achieved. At 5000 Hz, little modulation was observed. Therefore, pulsatile delivery may be operated up to 1000 Hz.

In summary, Example 1 shows that pulsatile delivery of DNA molecules can be achieved in a simple and reliable way using a nanopipette. This ultra-sensitive technique is able to deliver a few molecules per pulse. The combination of surface modification of the inner wall and reductions in the size of the pipette, may allow more precise control of the delivery of not only the nucleic acid but protein and other nanoparticles as well. The technique may open new routes for accurate antisense drug delivery into a single living cell. Furthermore, this technique can easily be combined with SICM technology and may be developed as a versatile nanopen for micro and nanofabrication of biochips in aqueous environments.

EXAMPLE 2

In this Example, the pipette is used for the delivery of biotinylated and fluorophore-labelled DNA to a streptavidin-coated surface.

Figure 5:
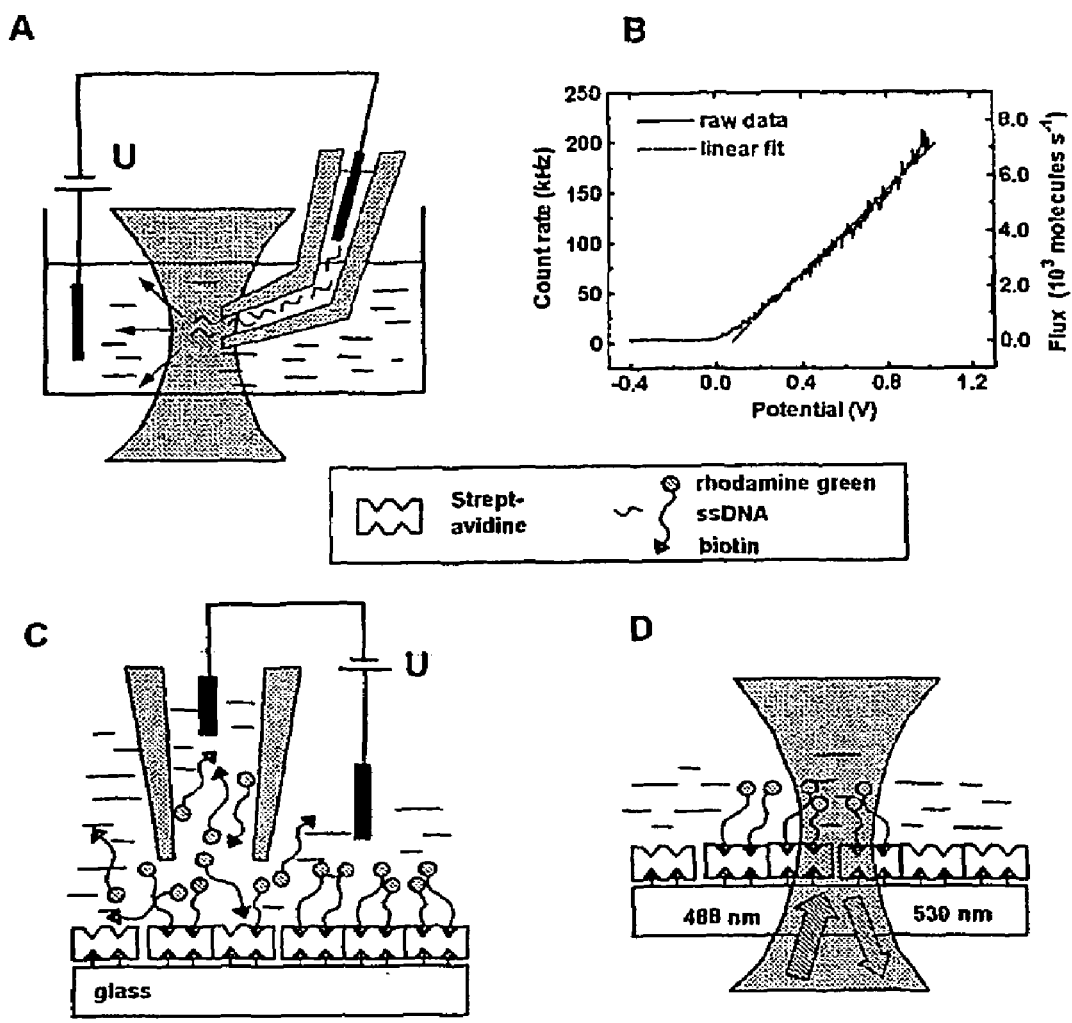
FIG. 5: A) Schematic of the experiment to measure the flow of DNA molecules out of the pipette. The pipette is filled with 100 nM rhodamine green labelled, single stranded (ss) DNA molecules. When a positive voltage is applied to the Ag/AgCl electrode in the bath, the molecules are driven out of the pipette. Fluorescence under 488 nm laser excitation (100 μW) can be detected using a microscope and a photon counting avalanche photodiode. The blue area depicts the confocal laser illumination. B) Fluorescence intensity of rhodamine green labelled ssDNA as a function of the electrode potential. The right y-axis shows the flux of molecules leaving the tip, estimated by single molecule counting experiments. C) Schematic of the deposition of ssDNA onto the streptavidin coated glass surface in phosphate buffer solution (10 mM $Na_2HPO_4$, 137 mM NaCl). The DNA molecules are labelled with biotin and rhodamine green. The ion current flowing through the tip is used to control the tip-surface distance and the DNA is immobilized by the streptavidin-biotin binding. D) Detection of the written structures by scanning confocal fluorescence microscopy, exciting the rhodamine green labelled DNA at 488 nm and recording the fluorescence centred at 530 nm.

First, the flow of single-stranded DNA (see above) out of the nanopipette was studied, using fluorescence measurements at the tip of the pipette; see FIG. 5A. The same rhodamine green-labelled oligonucleotide as in Example 1 was used.

Nanopipettes were routinely made by a laser-based pipette puller (Sutter Instrument P-2000). Fluorescence was measured using a home-made single-molecule confocal fluorescence microscope, based on a Nikon Diaphot 200 with an oil immersion objective (100×, NA 1.30) and an avalanche photo-diode detector (EG&G SPCM AQR-141). 100 W of the 488 nm radiation from an argon ion laser was used for excitation.

Single molecule counting was used to estimate the number of DNA molecules leaving the pipette, as described above. It was found that the flux of DNA could be controlled by a voltage applied between the counter-electrode and an electrode inside the pipette. When the counter-electrode was at a negative potential relative to the pipette, negligible DNA flowed out of the tip. On application of a positive potential, DNA flow occurred and the flux was linear with applied potential; see FIG. 6B. This demonstrated that there is fine control of the rate of DNA delivery by controlling the applied potential over a convenient and modest voltage range.

Next the DNA was deposited on a streptavidin-coated glass surface, using ion conductance control of the pipette sample distance; see FIG. 5C. More particularly, glass-bottomed dishes (WillCo, Wells B.V., NL) were coated with streptavidin by BioTeZ Berlin-Buch GmbH. The biotin-binding capacity of these coatings is 280 fmol/mm$^2$ (68 pg/mm$^2$). Writing experiments were performed using an inverted microscope (Eclipse TE 200, Nikon) with two piezoelectric xyz-stages, one to move the pipette and one to scan the sample. The tip was modulated ±50 nm and the modulated ion current, recorded by a lockin amplifier, was used for distance control. Phosphate buffer solution (10 mM Na$_2$HPO$_4$, 137 mM NaCl) was used in the bath and in the pipette containing 100 nM ssDNA.

Figure 6:
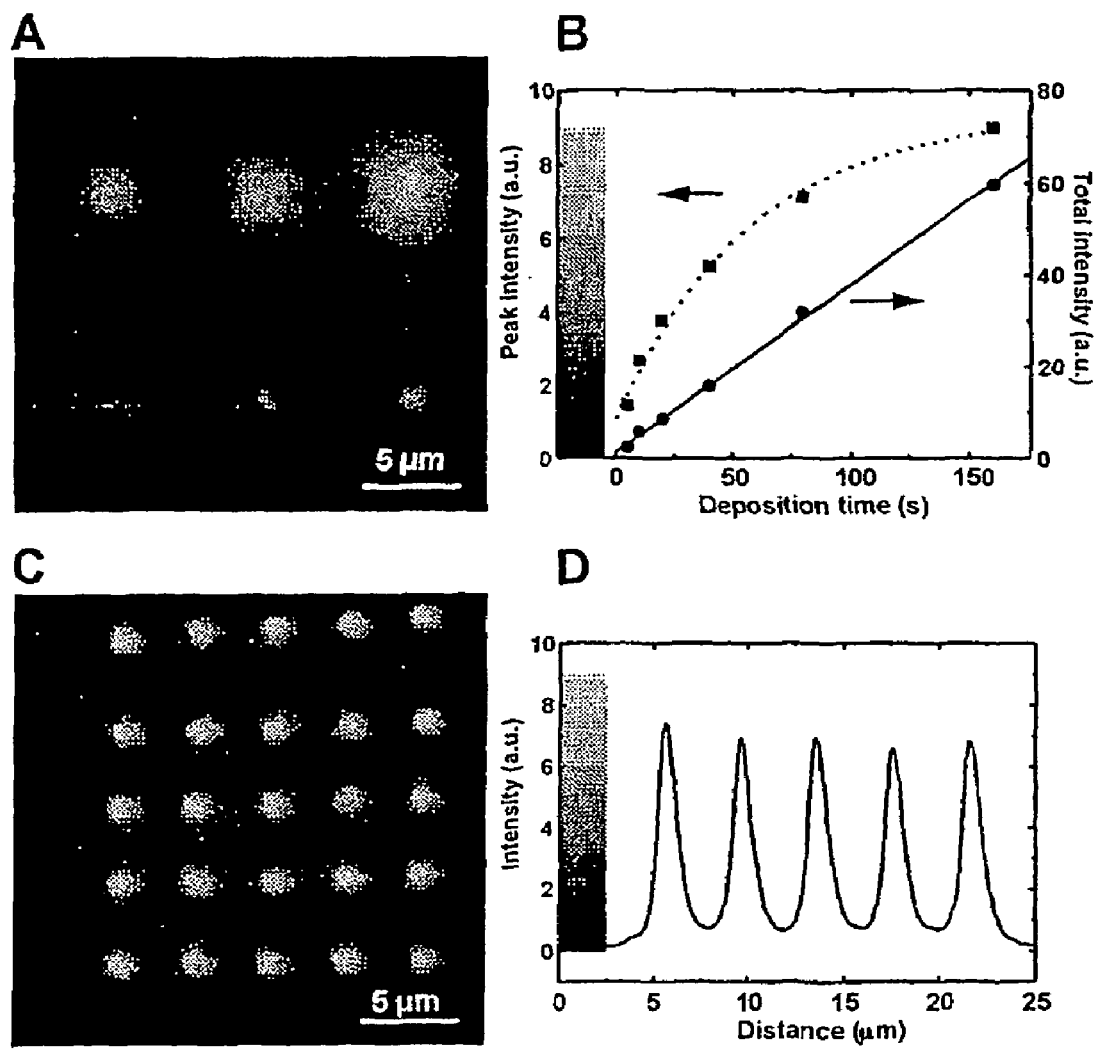
FIG. 6: A) Fluorescent image of dots written in DNA on the streptavidin coated surface with increasing deposition time of 5, 10, 20, 40, 80, and 160 s, the image size is 25 μm×25 μm, the colour map used to display the intensity is given in FIG. 2B. B) Peak intensity (blue squares) and total intensity (black circles) of the dots in FIG. 2A as a function of the deposition time. C) 25 dots with 10 s deposition time each, the image size is 25 μm×25 μm, the colour map is shown in FIG. 1D. D) A linescan of the bottom row in image 2 C shows the reproducibility of the deposition and a fwhm of 1.0±0.1 μm.

The sample piezo stage carrying the glass slide was manipulated with nanometer precision by manually changing the input voltages. In these experiments, the voltage applied to the counter electrode was kept constant at 600 mV, so that the flux out of the pipette was about 4000 molecules/s. FIG. 6A shows spots of DNA where the pipette was left close to the surface for increasing lengths of time, from 5 s to 160 s. Streptavidin-biotin binding immobilizes the DNA at the surface and fluorescence of the rhodamine-labelled DNA was detected by scanning confocal microscopy. The detection was done on the same instrument with 0.5 μm optical resolution (FIG. 5D). Images were recorded under 30 μW illumination at 488 nm. The fluorescence signal was detected using an oil-immersion objective (100×, NA=1.25) and a photomultiplier tube detector. A dicroic beamsplitter, longpass filter and a 50 μm pinhole were used to separate the fluorescence signal and to reject background signal and laser scattering.

Spots of the deposited DNA are clearly seen in the image. The overall intensity increases linearly with the deposition time (FIG. 6B), whereas the peak intensity shows a saturation effect with a halftime of 40 s. As a result, the detected full width of half maximum (fwhm) of the bell-shaped intensity profile increases from 1.1 μm to 3.0 μm. FIG. 6C shows an array of 25 spots, deposited for 10 s each. The measured fwhm is 1.0±0.1 μm and the intensity varies only ±6% which shows the good reproducibility of the method.

Figure 7:
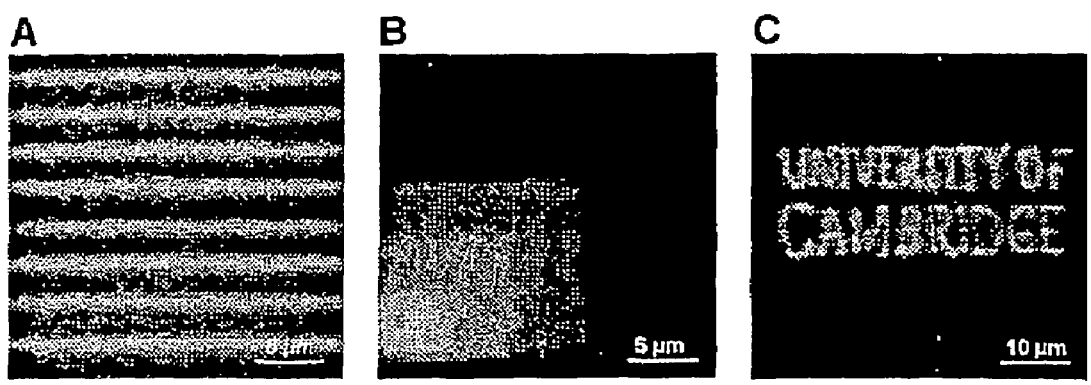
FIG. 7: A) Fluorescent image of lines written in DNA by scanning the sample under ion current distance control, 10 cycles with 35 μm/s were used for each line, the image size is 25 μm×25 μm. B) Squares of 20 μm to 5 μm width were written one over each other to create a pattern with increasing intensities, the image size is 25 μm×25. C) The words "UNIVERSITY OF CAMBRIDGE" written on a 50 μm×50 μm area, the individual letters are 6-8 μm high.

By scanning the stage with computer control, a more complex pattern can be produced. FIG. 7A shows lines separated by 3 μm, again the width is 1.0 μm. In FIG. 7B, squares were written one over another, so that areas of different intensity were produced, demonstrating the possibility of not only the formation of patterns but also of writing in "grey-scale". Moving the pipette by manually changing the input voltages of its piezo stage allows the writing of letters in DNA of only 6-8 μm size onto the streptavidin surface; see FIG. 7C.

Since the operation is in ionic solution, the feature size will depend on the distance the pipette is held from the surface and diffusion. The feature size may be extracted using the steady state concentration profile derived for ultra-microelectrodes in the diffusion limited case, as described by Bond et al, J. Electroanal. Chem. 1988, 245, 74. For a 100 nm pipette held 75 nm from the surface, the fwhm of the features would be expected to be about 300 nm. The observed feature size is a factor of 3 larger and this may be due to 2D diffusion of the DNA on the surface and the low density of streptavidin sites on the glass surface. However, the feature size is at least one order of magnitude smaller than that obtained for DNA deposition in air, and control of the amount of DNA delivered is simple.

Sub-micron features can be achieved by optimisation of the method, including the use of finer pipettes, using higher density surfaces and covalent attachment chemistry. However, the current feature size is well-suited for optical read-out. This method is also simple and operates under physiological conditions. It is straightforwardly extendable to other biological molecules, as indicated by the preliminary experiments on protein G and streptavidin, and is applicable to enzymes and antibodies. It may also be used to produce complex biological structures on surfaces.

EXAMPLE 3

A protein array was written using the same experimental setup as for the DNA array. A solution of 100 nM fluorescently-labelled protein G in phosphate buffer solution (10 mM Na$_2$HPO$_4$, 137 mM NaCl) was backfilled into the pipette and the same phosphate buffer was used in the bath. Using a pipette of 100 MΩ resistance, the protein exits out of the pipette on application of a voltage of −500 mV to the Ag/AgCl electrode in the bath. The surface of a microscope coverglass was treated with aminosilane to provide a positive surface charge. The pipette was controlled over this surface at a distance of about 75 nm using the modulated ion current as a feedback signal. Pipette modulation was about ±50 nm. Moving the pipette under these conditions over the surface allows the protein to be deposited onto the glass surface. The amount of protein delivered to the surface depends on the time the pipette is held at one position. It was detected with 10 μW excitation at 488 nm and the same confocal fluorescent microscope as used for the DNA array.

EXAMPLE 4

This Example illustrates modifying a glass nano-pipette to reduce protein adsorption.

3-[Methoxy(polyethyleneoxy)propyltrimethoxysilane] (PEG-Silane, >90%, av. FW 460) was purchased from ABCR (Germany), and anhydrous 1,4-dioxane was purchased from Aldrich.

(1) Freshly pulled glass nano-pipettes were dipped into a freshly prepared 5% PEG-silane (v/v in anhydrous 1,4-dioxane) solution for 5-10 mins. The pipettes were then washed 20 times in pure 1,4-dioxane by dipping the tips into and then pulling out from the pure 1,4-dioxane solution. The dipping and pulling cycle results in 1,4-dioxane entering into and coming out of the tip region of the pipette as observed via a confocal microscope.

(2) The modified tips were then baked in an oven at 100° C. at ambient atmosphere for 2 hrs. The baking process is necessary to attach the PEG-silane covalently to the glass surface of the tip.

(3) After the baking, the pipettes were used to deliver Alexa 488 modified streptavidin (Molecular Probes) onto the biotin-modified glass surface at a concentration of 100 or 10 nM in PBS buffer (10 mM phosphate, 150 mM NaCl, 2 mM NaN$_3$, pH 7.20) to form sub-micrometer sized protein arrays.

As the surface property of the pipettes is difficult to characterize, a control experiment on the water wettability of glass cover slips was carried out. The contact angle for pure water before the modification was ≦5°. After the modification, the contact angle increased to ca. 37±1°, in good agreement with the literature value of PEG-terminated surfaces, suggesting the successful modification of the glass surface.

The invention claimed is:

1. A method for the production of an array of biomolecules immobilised on a substrate, which comprises the deposition of the biomolecules from a micropipette containing them, onto the substrate, in a liquid environment, wherein the distance of the micropipette from the substrate is controlled in response to the ion current in the liquid.

2. The method according to claim 1, wherein the biomolecules are polynucleotides.

3. The method according to claim 1, wherein the biomolecules are polypeptides.

4. The method according to claim 1, wherein the micropipette is oscillated substantially normal to the surface of the substrate, and the said distance is controlled by modulation of the ion current.

5. The method according to claim 1, wherein the micropipette is oscillated substantially normal to the surface of the substrate, with large or increased amplitude, so that the micropipette is at or very close to the surface of the substrate, on deposition.

6. The method according to claim 1, wherein the micropipette has two or more barrels.

7. The method according to claim 6, wherein different molecules are delivered from each barrel.

8. The method according to claim 1, which comprises delivering different biomolecules to the same point on the substrate, to build up a structure or molecule at a desired location.

9. The method according to claim 1, wherein the deposition is controlled by the application of pressure or voltage.

10. The method according to claim 1, wherein the feature size of the array is less then 1 μm.

11. The method according to claim 10, wherein the feature size is 10 to 100 nm.

12. The method according to claim 1, wherein the deposition is controlled by the application of pressure and voltage.

* * * * *